Figure 3:
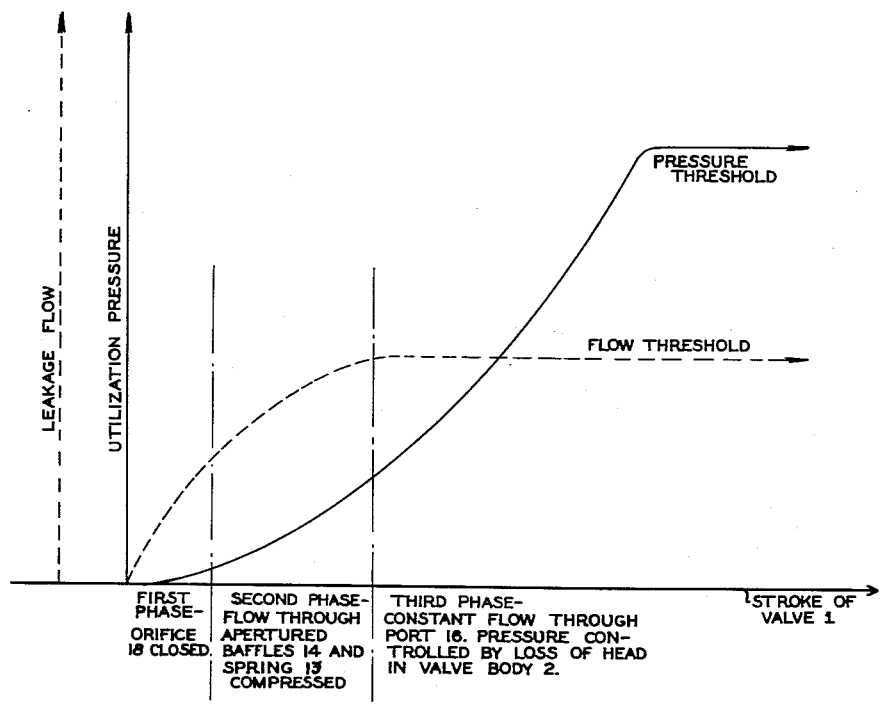

Sept. 19, 1961  A. BRUEDER  3,000,356
PRESSURE REDUCING DEVICE FOR HYDRAULIC SERVO-MECHANISMS
Filed Oct. 2, 1957  2 Sheets-Sheet 1
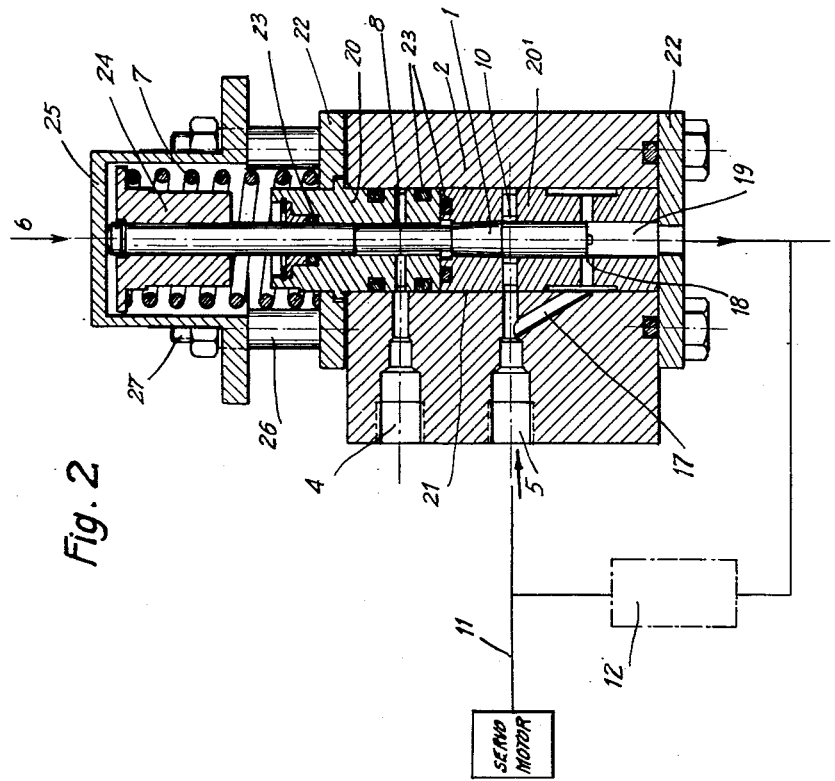
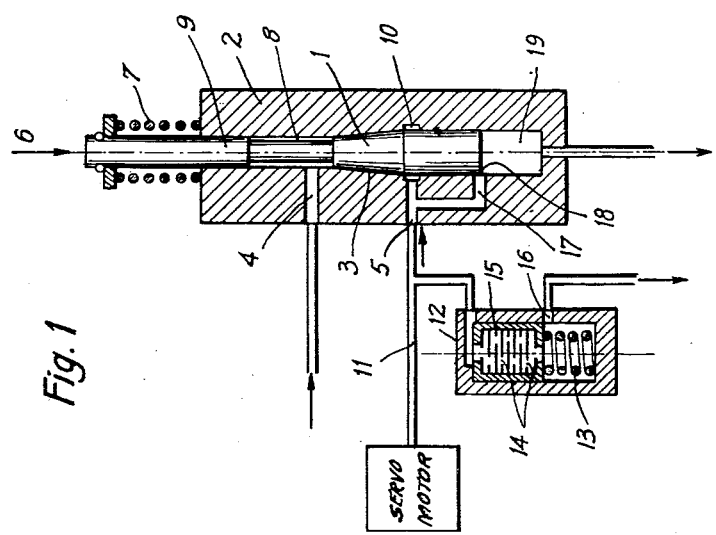

United States Patent Office 3,000,356
Patented Sept. 19, 1961

3,000,356
PRESSURE REDUCING DEVICE FOR HYDRAULIC SERVO-MECHANISMS
Antoine Brueder, Paris, France, assignor to Societe Anonyme Andre Citroen, Paris, France, a corporation of France
Filed Oct. 2, 1957, Ser. No. 687,759
Claims priority, application France Oct. 29, 1956
4 Claims. (Cl. 121—38)

This invention relates to hydraulic servomechanisms or systems in general and more particularly to an improved pressure-reducing device for hydraulic servomechanisms.

Known methods of hydraulically controlling servomechanisms or servo-action systems are divided into two groups, according to whether the pressure is utilized by delivering hydraulic fluid only at the time of the actual operation, or whether as the source of fluid under pressure delivers fluid continuously but increases the pressure thereof only when the output of the controlled apparatus is reduced or suppressed.

In the first case it is possible to feed from a single source any desired number of devices, provided only that a sufficient fluid output is available. Within certain limits, it is possible to actuate different apparatus at different pressures, provided that the control valves are so constructed as to introduce an adequate pressure drop corresponding to the desired differential pressure.

As a rule, the adjustment of apparatus of this character is moderately sensitive, so that in those cases where the pressure is utilized only intermittently the devices of the second group are sometimes preferred.

The permanent output system is unusable for operating a plurality of mechanisms or apparatus from a single source, unless automatic and consequently complicated apparatus capable of isolating the mechanisms which must remain inoperative, are resorted to.

On the other hand, this mode of operation provides considerable sensitivity, the adjustment of the leakage being more flexible and gradual than the control of the direct pressure.

It is an important object of this invention to provide a hydraulic control system differing from those broadly reviewed hereinabove and operating a plurality of devices while affording all the desired flexibility of adjustment due to the provision of a pressure reducing device.

This hydraulic control system can be obtained by providing in the load circuit an output threshold, that is, a constant leakage output capable of being as low as desired but permitting the desired control of the operating pressure; in the vicinity of this output value the control valve has a gradualness operation which cannot be obtained in the absence of this specific feature.

Thus, the pressure reducing device consists essentially in providing in connection with a gradually opening control valve positioned between a source of hydraulic pressure and a load circuit, an output regulator which is branched off or by-passes the servo-action member and is adapted to establish the desired threshold output.

This combination may be used in many applications, for example in the control of hydraulic braking systems of automotive vehicles, wherein a very gradual control is desirable, or in the control or actuation of clutches, couplings and any other servo-operated mechanisms requiring a high sensitivity.

Figure 4:
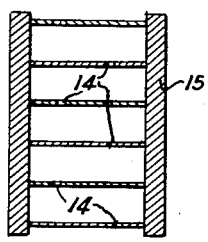

In order to afford a clearer understanding of the invention and of the manner in which the same may be carried out in the practice, reference will now be made to the accompanying drawing forming part of this specification and illustrating diagrammatically by way of example a typical embodiment of the invention. In the drawing:

FIGURE 1 is a diagrammatical axial section of the complete device,
FIGURE 2 is an axial section showing a typical embodiment of the control valve,
FIGURE 3 is a graph showing the operational characteristics of the apparatus, and
FIGURE 4 illustrates a detail of FIG. 1.

Referring first to FIG. 1, it will be seen that the movable member or slide valve 1 mounted in the valve body 2 constitutes, with its tapered seat 3, a progressively opening valve positioned between the hydraulic source of pressure connected to the valve body 2 through the duct 4, and the load circuit connected through the duct 5 to the valve body.

This slide valve 1 is controlled by a brake pedal (not shown), for instance, so that when this pedal is depressed the valve 1 moves in the direction of the arrow 6, a return spring 7 normally urging the valve to its closed position.

The source of hydraulic fluid under pressure (not shown) may consist for example of an accumulator and is adapted, through an annular space 8 formed by a thinner portion of the valve shank 9, the passage formed during the displacement of the valve 1 between this valve and its tapered valve seat 3, and the annular space 10 formed in the valve body, to feed the load circuit 11 and the output regulator 12 connected in parallel and leading to brake cylinders and to a reservoir (not shown) at atmospheric pressure in the specific application illustrated herein by way of example.

The operation of the regulator 12 is characterized by the fact that the spring 13 is so calibrated that its reaction corresponds to a pressure loss or leakage produced through the apertured baffles 14 of the thin-walled piston 15 (see also FIG. 4) when the latter partially covers the port 16 without obturating it completely, a given output corresponding to this given pressure loss or leakage.

In fact, it is readily understood that, as a function of the calibration of the spring 13, the apertures 14 in the thin walls permit of producing a loss or leakage of charge, i.e., a difference in pressure between the upstream and the downstream sides of the piston 15, with the latter obturating only partially the leakage port 16. There then results a constant leakage flow through said port, even when the pressure continues to mount upstream of the piston 15.

In fact, it must be noted that from that moment on, if the difference of pressure or of loss of load tends to increase, the output will tend to decrease, for the piston 15 will tend to close the port 16 more and more. However, if the output tends to decrease, the loss of charge will also tend to decrease, and the piston will then tend to uncover more and more of the port 16. As a result, regulator 12 produces a constant leakage flow which depends on the calibration of the spring selected to balance a given loss of load which, in turn, conditions the output in question.

Moreover, in the case illustrated and in order to permit a quick bleeding of the brake cylinders, when no action is exerted on the brake pedal, the valve body comprises a bleeding duct 17 by-passing the connecting duct 5, the bleeding orifice 18 being uncovered by the slide valve 1 as the latter is moving to its inoperative position, and opening into a chamber 19 connected to the reservoir at the atmospheric pressure.

The device described hereinabove operates as follows:
The resistance encountered by the flow of fluid under pressure as a function of the slide valve opening varies the load pressure from zero value to a pressure close to the feed pressure with a constant leakage practically independent of the temperature and of the characteristics of the output regulator utilized.

During a first phase (see FIG. 3) corresponding to the initial portion of the slide valve movement in the direction of the arrow 6, the pressure increases at a very slow rate until the port 18 is obturated. The difference between the inoperative position of the slide valve and the position in which it obturates the port 18 is so calculated that during this phase the feed input permitted by the valve remains lower than the output for which the regulator 12 is adjusted.

During a second phase corresponding to a longer portion of the valve movement the pressure increases slowly as the port 16 of the regulator remains wide open until the load pressure remains substantially equal to the ratio of the calibration of the adjustable spring 13 to the cross-sectional area of the regulating slide 14, 15.

Then, during a third phase the regulator 12 permits the passage of a constant output, characteristic of its specific adjustment, and the load pressure approaches the value of the feed pressure inasmuch as the loss of pressure due to the position of the slide valve 1 decreases when the cross-sectional area allowed thereby is increasing.

It will be readily understood that at the common limit of the second and third phases there corresponds an output threshold in the vicinity of which the control valve has a progressiveness which could not be obtained by directly controlling the pressure.

On the other hand, it appears clearly that with this arrangement it is possible to contemplate a system in which a plurality of servomechanisms can be controlled from a common source of fluid under pressure, each servomechanism being associated with a separate regulator consistent with the operative characteristics of the relevant servomechanisms.

In the embodiment illustrated in FIG. 2 the control valve comprises the same component elements as those already shown in FIG. 1, these elements being designated by the same reference numerals. It will be seen that the central portion of the valve body consists of two superposed members 20, 20'; to facilitate the machining of these parts, the joint between these members lies just above the tapered seat; besides, these members 20, 20' are held in a bore 21 between two clamping plates 22 and sealed relative to the bore and slide valve at adequate locations, as well as to each other, by ring-shaped gaskets 23.

A return spring 7 comprises in addition a guide member 24, the member operatively connected to the brake pedal acting on the shank 9 of slide valve 1 through the medium of a bearing member 25 guided by adequate portions or sleeves 26 of the assembling bolts 27 the nuts of which constitute the abutments for the aforesaid bearing member.

Of course, the embodiment shown and described herein is given by way of example only and should not be construed as limiting the invention, as many modifications may be brought thereto without departing from the spirit and scope of the invention as set forth in the appended claims.

I claim:

1. Apparatus for coupling a fluid pressure source to a pressure responsive device comprising a gradually opening valve coupled to said source, first means coupled to and controlling the valve, second means coupling said valve to said device, and constant-leakage means coupled to said second means and establishing an output threshold providing for a progressively controlled loss of load in said valve and enabling the lowering of the pressure of said source to a predetermined maximum pressure.

2. Apparatus as claimed in claim 1, the regulator means comprising a cylinder connected at one end to said second means and defining a radial discharge opening, a hollow piston in the cylinder at said one end, and a spring in the cylinder at the other end thereof and calibrated to provide said output threshold, said spring restricting movement of the piston, said piston internally including apertured baffles for the discharge of fluid from the second means through said radial opening.

3. Apparatus as claimed in claim 1, wherein the valve comprises a body defining ducts and a bore having a tapered seat connecting the ducts, the ducts and bore connecting said source to said second means, and a tapered valve member connected to said first means and normally abutting against said seat.

4. Apparatus as claimed in claim 3, wherein said body defines an extension for said bore, the extension opening to atmospheric pressure, the body further defining a duct coupled between the duct coupled to the second means and said extension.

References Cited in the file of this patent

UNITED STATES PATENTS

| | | |
|---|---|---|
| 2,536,138 | Moore | Jan. 2, 1951 |
| 2,572,270 | Majneri | Oct. 23, 1951 |
| 2,767,688 | Spiller et al. | Oct. 23, 1956 |